United States Patent [19]

Paul et al.

[11] Patent Number: 4,601,021
[45] Date of Patent: Jul. 15, 1986

[54] HIGHLIGHTING AND CLASSIFYING SEGMENTS ON A CRT DISPLAY

[75] Inventors: Byron G. Paul, Portland; James H. Maynard, West Linn; John C. Dalrymple, Newberg, all of Oreg.

[73] Assignee: Tektronix, Inc., Beaverton, Oreg.

[21] Appl. No.: 684,962

[22] Filed: Dec. 19, 1984

Related U.S. Application Data

[63] Continuation of Ser. No. 367,525, Apr. 12, 1982, abandoned.

[51] Int. Cl.$^4$ ........................ G06K 9/20; G06F 15/20
[52] U.S. Cl. ..................................... 364/521; 340/721
[58] Field of Search ............... 364/300, 518, 521, 522; 340/703, 726, 721, 715

[56] References Cited

U.S. PATENT DOCUMENTS

| | | | |
|---|---|---|---|
| 3,952,184 | 4/1976 | Bassard | 364/300 X |
| 4,107,780 | 8/1978 | Grimsdale et al. | 340/721 X |
| 4,138,726 | 2/1979 | Girault et al. | 364/521 |
| 4,143,360 | 3/1979 | Bernhart et al. | 364/518 X |
| 4,165,506 | 8/1979 | Brands et al. | 340/721 X |
| 4,179,823 | 12/1979 | Sullivan et al. | 364/521 X |
| 4,205,389 | 5/1980 | Heartz | 364/521 X |
| 4,239,351 | 12/1980 | Williams et al. | 364/521 X |
| 4,308,587 | 12/1981 | Kaufman | 364/521 X |
| 4,352,105 | 9/1982 | Harney | 340/715 X |
| 4,368,463 | 1/1983 | Quilliam | 340/720 X |
| 4,510,567 | 4/1985 | Chang et al. | 364/300 |

*Primary Examiner*—Edward J. Wise
*Attorney, Agent, or Firm*—John H. Bouchard; Francis I. Gray; John P. Dellett

[57] ABSTRACT

A graphics display terminal is disclosed having a capability of responding to at least two unique input commands. A first assigns a segment to a group of classes and also removes the segment from membership in another group of classes. A second is a matching condition which requests that all the segments lying within a certain group of classes and/or not lying within another group of classes be identified, the CRT terminal highlighting these identified segments in response to a command from the operator. The second command is called a matching condition. Once all of the segments in a memory are located, which satisfy the matching condition, the operator can direct the terminal to blink or otherwise highlight the identified segments retrieved from memory.

6 Claims, 14 Drawing Figures

FIG.2B.
DISPLAY CONTROLLER
PICTURE PROCESSOR

FIG. 2C.
SPECIAL PURPOSE PICTURE PROCESSOR (SPPP) 39
(INTERFACES TO AND DETAILS OF CLASS MATCHING LOGIC)

FIG. 2D.
GENERAL PURPOSE PICTURE PROCESSOR (GPPP) 38

HIGHLIGHTING AND CLASSIFYING SEGMENTS ON A CRT DISPLAY

This is a continuation of application Ser. No. 367,525 filed Apr. 12, 1982, and now abandoned.

BACKGROUND OF THE INVENTION

1. Field of the Invention

The present invention is used in a Graphics Display Terminal and relates to a feature whereby certain segments displayed on the CRT can be classified and assigned to or removed from one or more classes, and certain ones of these segments, which satisfy an input condition, can be modified or highlighted on the display.

2. Description of the Prior Art

Graphics Display Terminals display images which comprise a plurality of "segments". For example, when displaying a street map which includes a plurality of restaurants, the restaurants may be considered to be "segments". A graphics display terminal used in an air traffic control environment may display the local air traffic, where each air vehicle being displayed may be considered a "segment". In a military environment, air and sea traffic may be displayed on such a terminal, each sea and air vehicle being a "segment".

The prior art graphics display terminals identified each segment by a segment number and classified it by assigning to it a class number. The class number would, for example, classify the segment as being a ship or an airplane. However, these prior art terminals could not selectively assign these segments to or remove these segments from more than one class simultaneously using a single input command instruction. In addition, these prior art terminals could not selectively recall from memory and modify the attributes or highlight certain ones of these segments which satisfy a particular input condition. Furthermore, these prior art terminals could not perform a wide range of "generic" segment operations on a set of segments determined by an arbitrary Boolean sum-of-products of class membership by referring to such a set through a reserved segment number.

SUMMARY OF THE INVENTION

It is therefore a primary object of the present invention to provide for a graphics display terminal which is capable of categorizing and assigning a segment to a group of classes and capable of removing a segment from membership in another group of classes.

It is another object of the present invention to provide a capability in a graphics display terminal wherein an input condition may be introduced, the terminal recalling all segments from memory which satisfy the input condition, the terminal modifying the attributes of, deleting, blinking or otherwise highlighting on a display the recalled segments in response to instructions from the operator or from the application program.

These and other objects of the present invention are accomplished by providing a microprocessor, a keyboard connected thereto, a program memory also connected thereto, a system bus connected to the microprocessor, a further program memory connected to the system bus, a segment data memory connected to the system bus, a display controller and a CRT also connected to the system bus. Firmware stored in the program memories allows the terminal to respond to two unique input commands: a first assigns a segment to a group of classes and also removes the segment from membership in another group of classes. A second determines a Boolean class-matching condition which may be used to specify a set of segments by their class membership. This set of "All Segments Matching the Current Matching Class" is referred to by a reserved segment number, allowing each of a wide range of segment operations to be performed on the entire set as the result of a single command to the terminal. For example, the terminal display may highlight these identified segments in response to a command from the operator or application program. One typical type of highlighting would be a blinking of the segments satisfying the matching condition.

Further scope of applicability of the present invention will become apparent from the description given hereinafter. However, it should be understood that the details of the description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

A full understanding of the present invention will be obtained from the detailed description given hereinbelow and the accompanying drawings which are given by way of illustration only and thus are not limitative of the present invention, and wherein.

DETAILED DESCRIPTION OF THE INVENTION

Before beginning the detailed description of the invention, a brief review of some of the basic principles behind set theory will aid in the understanding of the present invention.

Figures 1A, 1B, 2A:
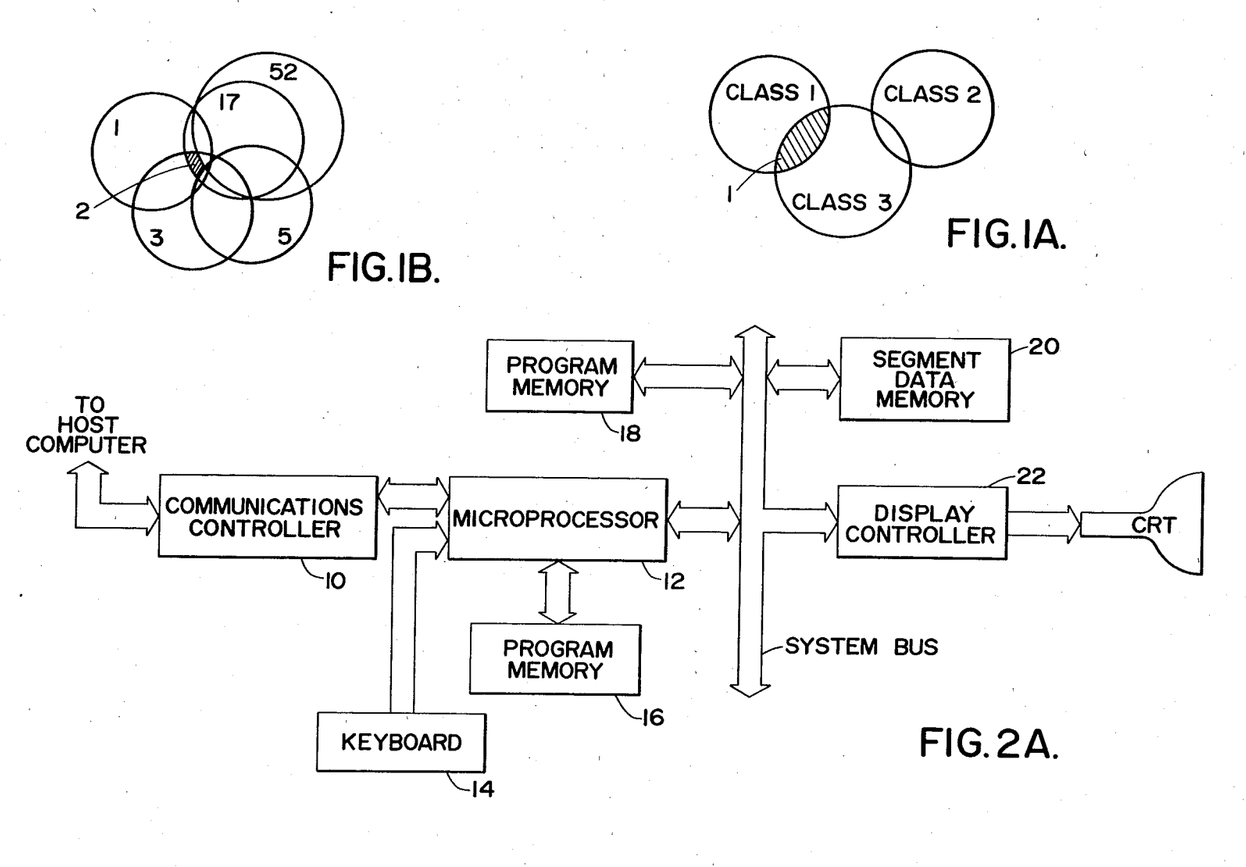
FIGS. 1a-1b illustrates some of the basic principles utilized by the present invention.
FIGS. 2a-2d represents system block diagrams of the pertinent portions of the graphics display terminal of the present invention.

Referring to FIG. 1a, three sets are shown: the set of all elements within class 1, the set of all elements within class 2, and the set of all elements within class 3. The shaded area in FIG. 1a(1), i.e., the intersection of these classes, defines the set of all elements which lie within both classes 1 and 3.

Referring to FIG. 1b, classes 1, 3, 5, 7, and 52 are shown. The shaded area (2) represents the following class of elements: the class of all elements which lie within classes 1, 3 and 7, but which *do not* lie within classes 5 and 52. A shorthand notation for designating this shaded area (2) in FIG. 1b is represented by the following notation:

$$1 \cap 3 \cap \bar{5} \cap 7 \cap \overline{52}$$

The present invention utilizes this set theory in classifying, modifying, and performing highlighting (and other operations) on certain "segments" which appear on a CRT display. A "segment" may be defined by reference to the following examples. When displaying a street map, which includes a plurality of restaurants, the restaurants may be considered to be "segments". Alternatively, in a military air control environment, a graphics display terminal used in this environment may display local air traffic. Each aircraft being displayed may be considered to be a segment. When displaying air and sea traffic, each of the air and sea vehicles may be considered to be a "segment".

The graphics display terminal of the present invention is capable of assigning one or more class numbers to any one segment, and is capable of removing the segment from membership in any one or more further classes. For example, in the above-mentioned military environment, one class may be the set of all aircraft. Another class may be the set of all aircraft which are unidentified. Still another class may be the set of all ships. A further class may be the set of all ships or aircraft which are military in nature. The present invention may assign an aircraft to a military class and/or remove the aircraft from an unidentified class.

The present invention is also capable of defining a certain matching condition. A matching condition is defined to be a request for recall of certain segments from memory which satisfy a certain condition. For example, a matching condition, using the above example shown in FIG. 1b, may be defined to be the following: "the set of all segments lying within classes 1, 3 and 7 and not lying within classes 5 and 52."

Consequently, by entering a matching condition, the present invention will recall from memory all of the segments which satisfy that condition. In our example, the present invention will recall from memory all of the segments which lie within classes 1, 3 and 7, and do not lie within classes 5 and 52.

Having defined some of the basic principles utilized by the present invention, and having further defined some of the basic capabilities of the present invention, let us now introduce and define certain input commands which are utilized to implement these capabilities.

The following command enables the present invention to add a particular segment number to any one or more classes, and to remove that segment from membership in any additional one or more classes:

---
<set-segment-class> <segment no.>
<array of classes to remove from>
<array of classes to add to>
---

Using the example shown in FIG. 1b, this command would be written as follows:

<s-s-c> <17032> <5,52> <1,3,7>

In the above example, segment no. 17032 is being removed from classes 5 and 52, but is being added to classes 1, 3 and 7.

Let us now introduce a second major command used by the present invention, the capability of which has already been defined above:

---
<set-current-matching-class>
<inclusion-array>
<exclusion-array>
---

The "set-current-matching-class" is the command name. The inclusion array is a group of classes of which the requested segments are defined to be members. The exclusion array is another group of classes of which the requested segments are defined not to be members.

Using the example shown in FIG. 1b of the drawings, this command would be written as follows:

<s-c-m-c> <1,3,7> <5,52>

This command will define the following set of segments: "the set of all segments which lie within classes 1, 3 and 7, but do not lie within classes 5 and 52".

The present invention utilizes a special segment number to designate all of the segments which satisfy the matching condition discussed hereinabove. This special segment number is "−3". The special segment No. "−3" will define the following set of segments: "the set of all segments which satisfy the matching condition". Note that the choice of the particular number −3 is not by itself critical; what is important is that *some* special segment number be chosen for this purpose. The following example illustrates the use of this special segment number:

"blink −3"

This command will cause all of the segment numbers on the CRT screen which satisfy the matching condition to blink.

To make full use of this special segment number, the operator or application program must first enter a matching condition. This will be done by entering the matching condition: "set-current-matching-class", "inclusion-array", "exclusion-array". Then, for example, this command may be followed with the further command "blink −3". These two commands would therefore cause the CRT display to blink all of those segments which conform to the specified matching condition.

A still further special segment number is used: the segment number "−1" means "all the segments currently displayed on the CRT". A command "blink −1" would cause all of the segments on the CRT screen to blink.

Now that the basic principles and capabilities of the present invention have been discussed, reference is made to FIG. 2a of the drawings of the present application wherein a system block diagram of the pertinent portions of the graphics display terminal of the present invention is illustrated. In FIG. 2a, a communications controller 10 is connected to the host computer. This is a serial to parallel converter for converting the serial data from the host computer into parallel data for use by the graphics display terminal of the present invention. A signetics part no. 2261 can be utilized to perform the function of the communications controller 10.

Connected to the communications controller is a microprocessor 12. An Intel 8086 may be used for the microprocessor. Connected to the microprocessor 12 is a keyboard 14 and a program memory 16. The microprocessor is connected to a system bus. Another program memory 18 is also connected to the system bus. A segment data memory 20 is connected to the system bus.

This memory contains the segment data words associated with each of the segments displayed on the CRT. The structure of the segment data words stored in the segment data memory will be discussed with relation to FIGS. 3 and 4 of the drawings.

A display controller 22 is connected to the system bus for controlling the display on the CRT. The display controller 22 is responsive to instructions from the microprocessor 12 for formulating the display on the CRT using the segment data words stored in the segment data memory 20. The microprocessor 12 operates in response to the instructions stored in the program memories 16 and 18. An Intel 2732 may be used for the program memories 16 and 18.

Figure 2B:
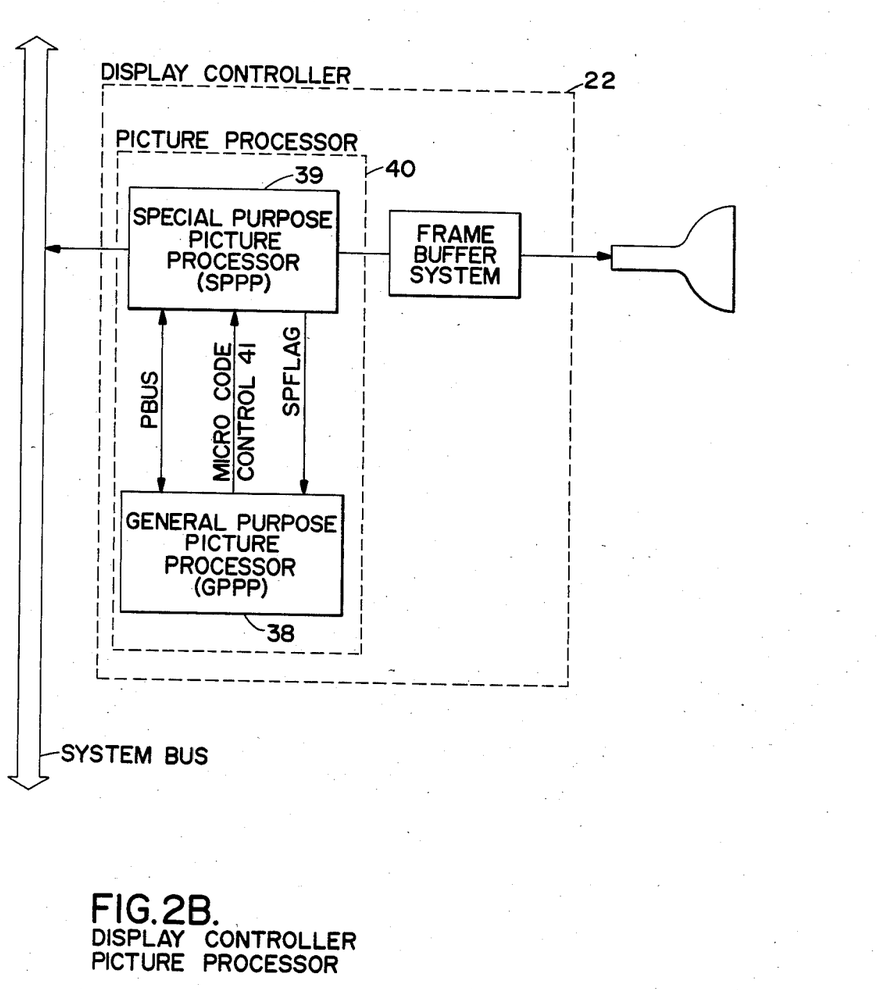

FIG. 2b illustrates a further detailed construction of the display controller 22 shown in FIG. 2a. A Picture Processor 40 provides the interface, command, and control of the bit-map display Frame Buffer System. Picture Processor 40 further includes a General Purpose Picture Processor (GPPP) 38 and a Special Purpose Picture Processor (SPPP) 39. The GPPP 38 is a general purpose, microcoded, bit-sliced processor which provides general command, control, and computation facilities for the Picture Processor 40. The SPPP 39 contains special hardware used by the (GPPP) 38 to perform specialized algorithms and to interface with the System Bus and with the Frame Buffer System.

The command and control interface between the GPPP 38 and the SPPP 39 is comprised of the PBUS, the microcode control bits 41, and the SPFLAG. Data is transferred between GPPP 38 and SPPP 39 on the PBUS. Control of the SPPP's 39 use of data on the PBUS is provided via the microcode control bits 41. Status bits from the SPPP 39 are read by the GPPP 38 on the SPFLAG line. Control of the bit selected to be placed on SPFLAG is provided via the microcode control bits 41.

Figure 2C:
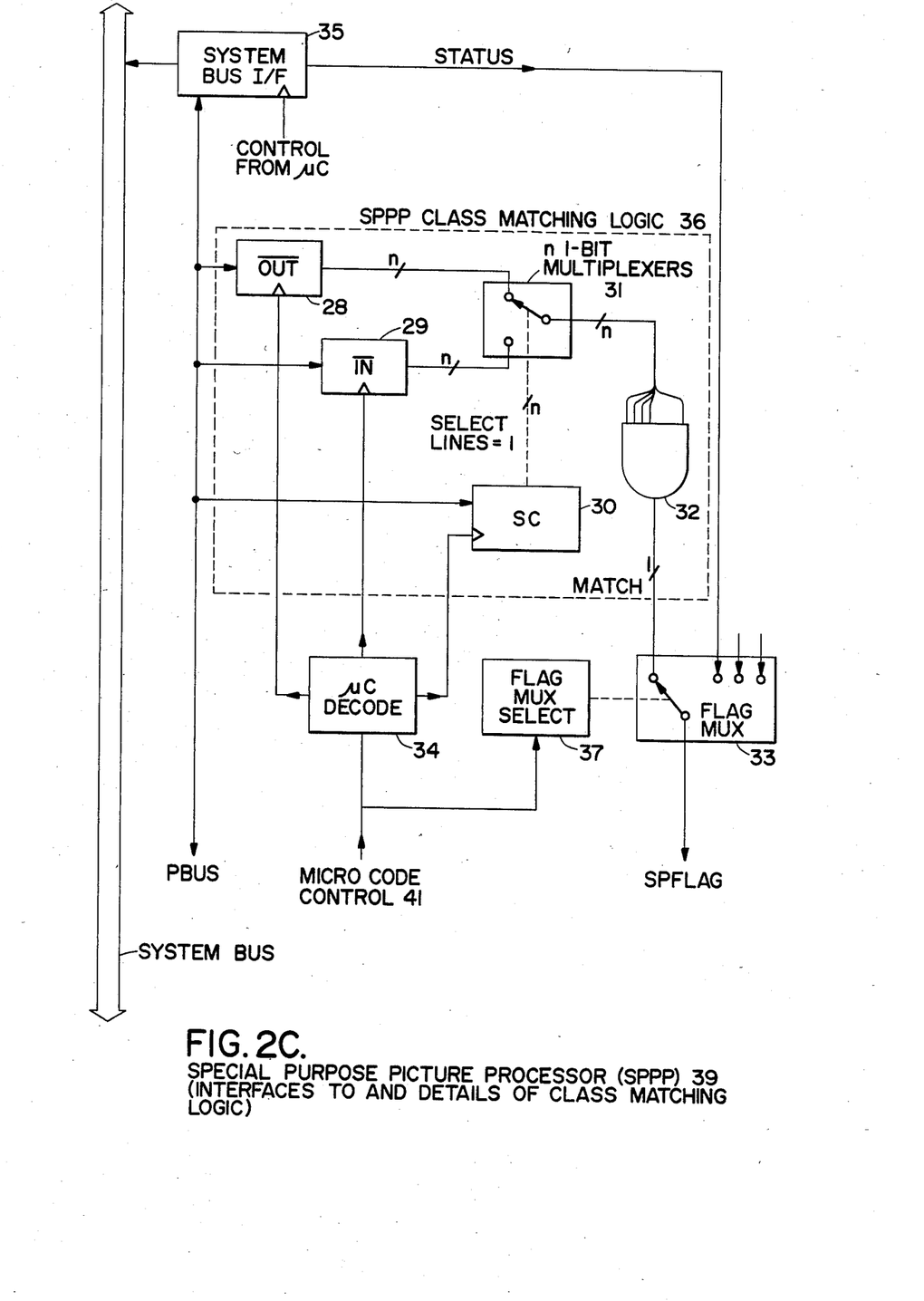

FIG. 2c illustrates a further detail construction of the special purpose picture processor (SPPP) 39 shown in FIG. 2b.

Figure 2D:
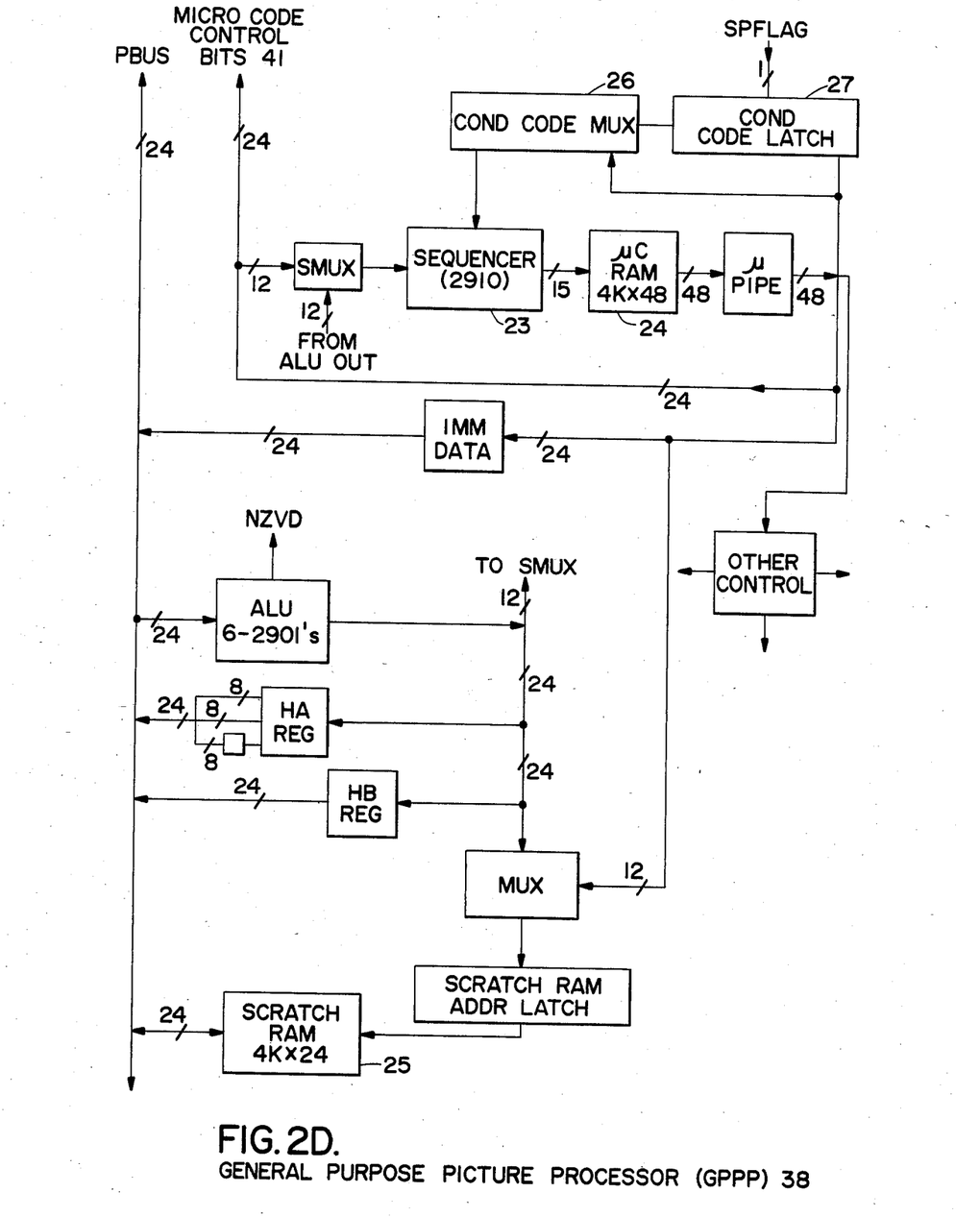

FIG. 2d illustrates a further detail construction of the General Purpose Picture Processor (GPPP) 38 shown in FIG. 2b.

In FIG. 2c, the Display Controller Special Purpose Picture Processor (SPPP) class matching logic 36 contains registers 28, 29, and 30 which are connected to multiplexers 31. 74LS374s may be used for the registers and 74LS257s may be used for the multiplexers. The AND logic 32 produces a single-bit MATCH signal which is output through flag mux 33 as SPFLAG, under control of decoder 34 and flag mux select 37. In FIG. 2d, the Display Controller General Purpose Picture Processor (GPPP) sequencer 23 is connected to condition code mux 26, program memory 24 and data memory 25. Intel 2164s may be used for these memories. The condition code mux 26, as enabled by condition code latch 27, is used to control the action of sequencer 23. Program memories 16, 18, and 24 contain the computer program instructions, i.e., the firmware and microcode, which are used to enable the system block diagram of FIG. 2 to perform the function of the present invention.

Figure 3:
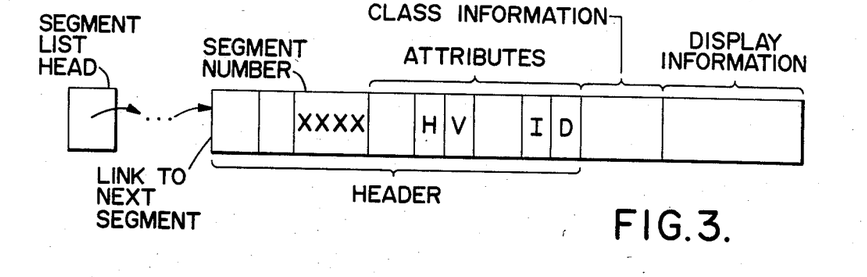
FIG. 3 represents the structure of the segment words and segment display list stored in the segment data memory.

Referring to FIG. 3, the structure of the segment data word stored in the segment data memory 20 is illustrated. The segment data word has associated therewith a particular segment number, in this example, number "xxxx". The first part of the structure includes the header. The header is comprised of the link to the next segment, the segment number, the particular attributes associated with the segment, and the class information. The attributes portion of the header information for each segment data word shown in FIG. 3 includes the following possible information: if the segment should be highlighted (H), that is, if it should blink on the CRT, a bit will be turned on in the attribute section of the header for insuring that this segment will blink. Another bit in the attributes portion of the header will be turned on to indicate that the segment is either visible or invisible (V). If the segment has been scaled, rotated or otherwise magnified, an image transform bit (I) will be turned on in the attributes section of the header. If the segment is detectable (D), a bit will be turned on in the attributes portion of the header to indicate that the segment is detectable. If the segment is detectable, the operator may use a "pick" operation to select the segment, and to move it to another portion of the CRT display for a subsequent design function. For example, if the segment is a resistor, and it is indicated as being detectable, the operator may move this resistor to another portion of the CRT display for a design of a circuit. The segment data words in the prior art terminals included a type or class number in the attributes section of the header to identify the segment as belonging to a particular type or class. In the segment data word of the present invention, as shown in FIG. 3, this type or class bit has been removed from the attributes section and a "class information" section has been added to the header. This "class information" portion of the header will be further discussed with respect to FIG. 4.

Figure 4:
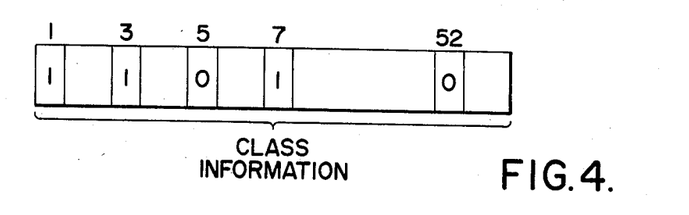
FIG. 4 represents the structure of the class information portion of the segment word illustrated in FIG. 3.

Referring to FIG. 4, and further referring to the example shown on FIG. 1b of the drawings, if the segment is designated as belonging to or being a member of classes 1, 3 and 7 but not a member of classes 5 and 52, as shown in FIG. 4, the bits associated with classes 1, 3 and 7 will be turned on, however, the bits associated with classes 5 and 52 will be turned off.

The functional operation of FIG. 2 will now be discussed as it relates to the input commands discussed in detail hereinabove. When the operator introduces the "set-segment-class" command, which includes the segment No., the array of classes to add to, and the array of classes to remove from, using the keyboard 14, or, if the host computer introduces this command via the communications controller 10, the microprocessor 12, in accordance with the instructions stored in the program memory 16 and 18 will search the segment data memory 20 for the particular segment number introduced via the keyboard. When the segment data word stored in the segment data memory 20 associated with the input segment number is located, the microprocessor will change the bits in the class information portion of the header (see FIG. 4) to correspond to the set of classes "to be added to", and "to be removed from", as defined by the "set-segment-class-command". The microprocessor will turn the appropriate bits, in the class information section of the header, either on or off in response to the input command entered via the keyboard 14 or introduced from the host computer via the communications controller 10. Once the bits in the class information section have been changed in accordance with the command, the segment data word is again stored in the segment data memory 20.

If the operator enters the "set-current-matching-class" command via the keyboard 14, or if this command is introduced from the host computer via the communications controller 10, the microprocessor 12, in accordance with the instructions stored in the program memories 16 and 18, will search the segment data memory 20 for all the segment numbers which lie within the "inclusion array", and which *do not* lie within the "exclusion array". In the example shown in FIG. 1*b* of the drawings, the use of segment No. −3 in a segment command will cause a search of the segment data memory 20 for all of those segments which lie within classes 1, 3 and 7, but which also do not lie within classes 5, and 52. This search may be performed by the microprocessor 12. It may also be performed by the microprocessor 12 and the GPPP 38 or by microprocessor 12, GPPP 38, and the SPPP 39 class matching logic 36 (28, 29, 30, 31, 32). First, consider the case where the search is performed by the microprocessor 12. If the operator enters the "blink −3" command, the microprocessor 12 will retrieve from the segment data memory 20 those segment data words which satisfy the above matching condition. The microprocessor 12 will note the segment numbers associated with the retrieved segment data words, and then the microprocessor 12, in accordance with the instructions stored in the program memory 16 and 18, will direct the display controller 22 to blink those segments on the CRT whose numbers match the segment numbers of the retrieved segment data words, retrieved from the segment data memory 20.

If the operator enters the "blink −1" command, via the keyboard 14, or if this command is introduced from the host computer via the communications controller 10, the microprocessor, in accordance with the instructions in the program memory 16 and 18, will locate all of the segment data words stored in the segment data memory 20, will note the segment numbers associated with those segment data words, and will direct the display controller 22 to blink all of the segments on the CRT whose segment numbers correspond to the segment numbers of the retrieved segment data words, retrieved from the segment data memory 20.

Figure 5A:
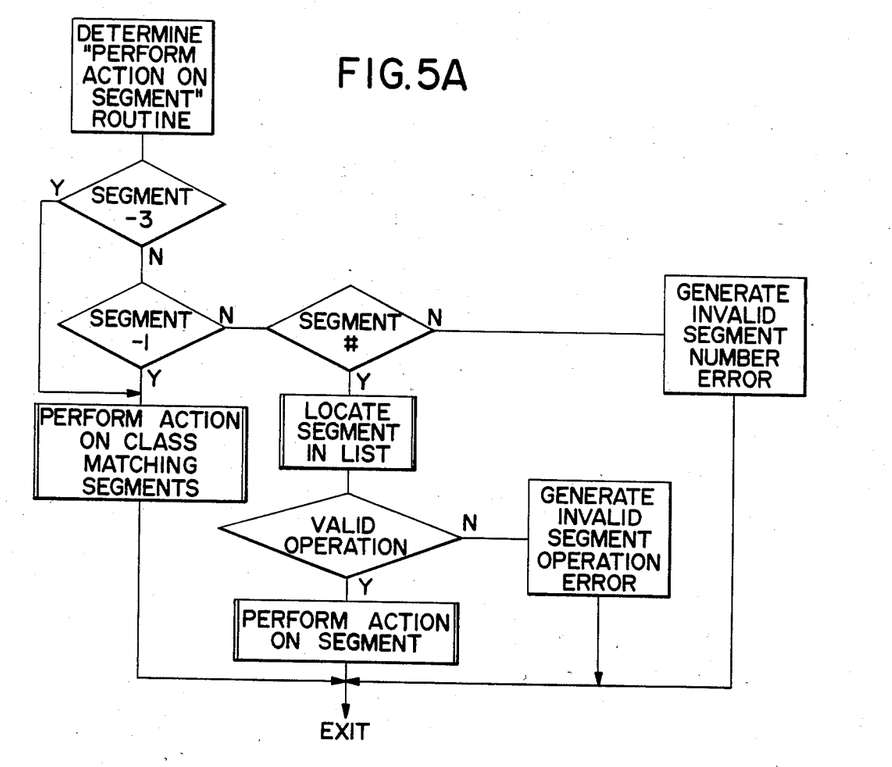
FIGS. 5a-5f represents the algorithms, stored in program memories, which are used to select and control the segments stored in the segment data memory.

The program stored in the program memories 16 and 18 are characterized by the following algorithm:

When microprocessor 12 receives a segment operation command, control is passed to a segment operation routine for that command. FIG. 5*a* is a flow chart showing the logic of such a Segment Operation Routine. Note that there is one of these routines for each segment operation for which <all segments matching the matching-class> or <all segments> are valid segment specifiers. Examples of such operations are those which set segment attributes:

<set-segment-highlight>,
<set-segment-detectability>,
<set-segment-visibility>,
<set-segment-image-transform>, etc.

Other such operations include
<set-segment-class>
and
<delete-segment>.

When a particular Segment Operation Routine receives control, it first determines a "Perform Action on Segment" routine which will be used to perform the required operation on a single segment once that segment has been located in the segment data memory 20.

Next, the segment number identifier which was passed as a parameter to the segment operation routine is tested to determine whether it is −3, i.e., represents <all segments matching the matching class>, or −1, i.e., represents <all segments>.

If the segment number is either −3 or −1, the Perform Action on Class Matching Segments (FIG. 5*b*) routine is invoked with two arguments: the segment number (−3 or −1) and the address of the "Perform Action on Segment" routine. The action of the Perform Action on Class Matching Segments will be described below.

If the segment number is neither −3 nor −1, it is checked to determine whether it is a valid segment number for the given operation. If it is not, an error is generated and the segment operation routine exit is taken. If it is, the Locate Segment in List routine is invoked to locate the particular segment in segment data memory 20 whose segment number is the number of the single segment upon which the operation is to be performed.

Once the segment is located, the operation to be performed is checked to see if it is a valid operation (this is necessary because some operations may not be performed on segments which are currently in use as graphic cursors, etc.). If the operation is invalid, an error is generated and the routine exit is taken. If the operation is valid, the "Perform Action on Segment" routine (which was determined when the segment operation routine was entered) is invoked, being passed the location of the particular segment upon which the operation is to be performed. When the "Perform Action on Segment" routine has completed the required operation, e.g., causing the particular segment to be highlighted, it returns control and the segment operation routine exists.

The Perform Action on Class Matching Segments (PACMS) routine (FIG. 5*b*) contains the algorithm for searching a segment list and performing the required action on either <all segments matching the matching class> or <all segments>. Note that FIG. 5*b* contains both segment list searching/action logic and segment class matching logic. The segment class-matching logic is enclosed in a dotted box.

Figure 5B:
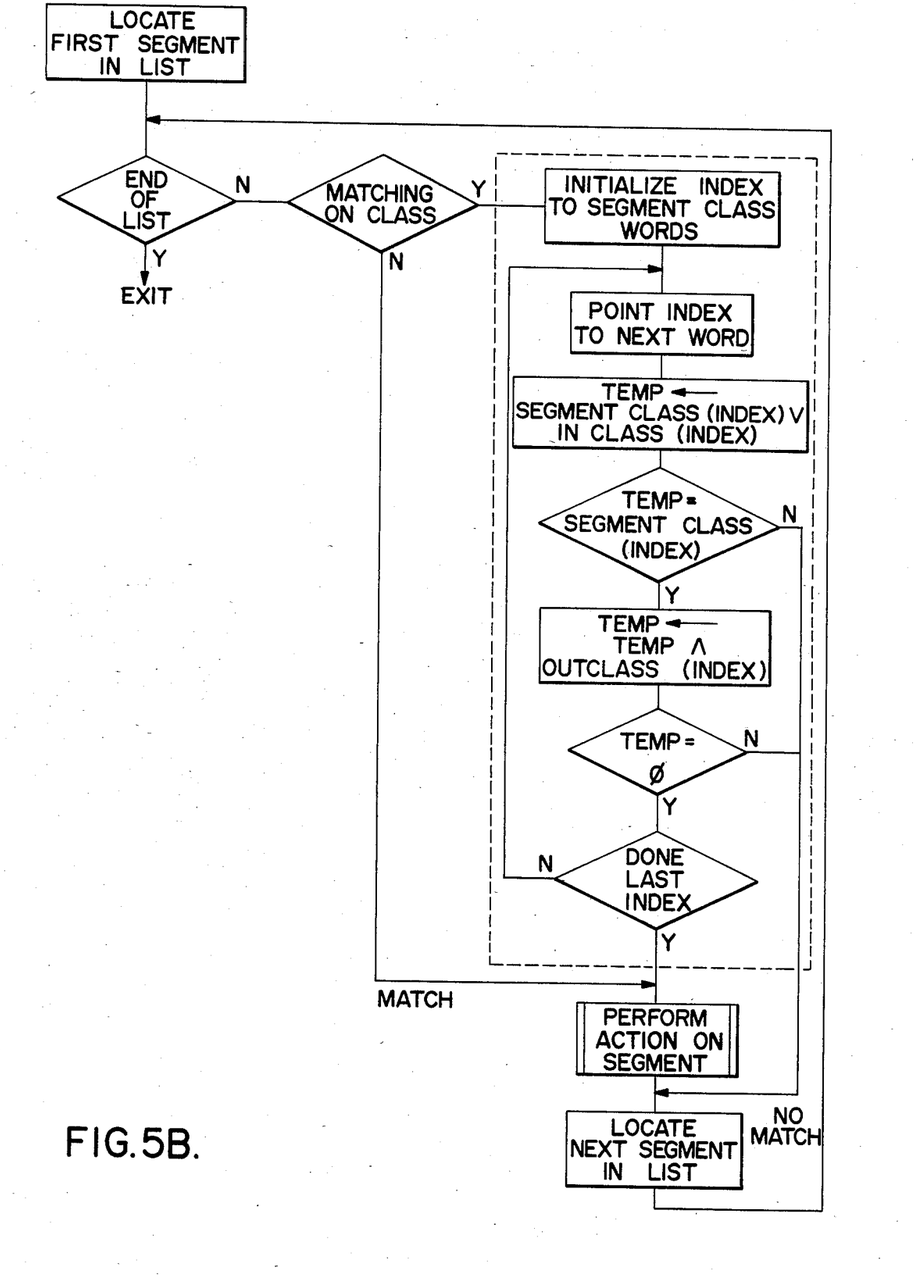

When the PACMS routine is entered, the first segment in the segment list (FIG. 3) is located via the Segment List Head pointer in segment data memory 20.

The segment pointer is checked to determine if it is an End-of-List pointer, and if it is, the exit from this routine is taken. If it is not, the segment number passed to this routine is checked to determine whether it represents <all segments> or <all segments matching the matching class>.

If the segment number represents <all segments>, control is passed to a point which will invoke the "Perform Action on Segment" routine, located the next segment in the segment list, and return control to the above check for End-of-List pointer.

If the segment number represents <all segments matching the matching class>, the segment class matching algorithm (dashed box) is executed.

First, a temporary INDEX variable is initialized to prepare to locate the first word of the segment class field to be checked. Note that this INDEX will also be used to locate words in the segment-class-array "SegClass", the inclusion-array "InClass", and the exclusion-array "OutClass" in the segment data memory. Next, the INDEX is adjusted to locate the next array word positions to test. (note that this requires the INDEX initialization value above to be a value which locates the words either immediately above or immediately below the arrays).

A temporary variable TEMP is now set equal to the INCLUSIVE OR of the SegClass and InClass words located by INDEX. If TEMP is now unequal to the SegClass (INDEX) word, then the match has failed, since there must be at least one bit on in InClass (INDEX) which is not on in SegClass (INDEX). In this case the NO MATCH branch from the matching logic is taken, the next segment in the segment list is located, and control returns to the End-of-List check above.

Next, TEMP is ANDed with OutClass (INDEX) and the result is compared to zero. If it is nonzero, then the match has failed, since at least one bit of OutClass (INDEX) and the corresponding bit of TEMP, currently the corresponding bit of SegClass (INDEX), must be 1. In this case the NOMATCH branch from the matching logic is taken (the next segment in the segment list is located, and control returns to the End-of-List check above).

Now INDEX is checked to determine whether it is the last INDEX value to be processed for the SegClass, InClass, and OutClass arrays. If it is not the last value, control returns to the point above where INDEX is adjusted to locate the next array word positions to test. If it is the last INDEX value, the segment class match has succeeded on all words of the SegClass array, and the MATCH branch from the matching logic is taken. (Note that this is the point to which control is passed if the matching logic is not performed, i.e., if the segment number passed to the PACMS routine represents <all segments>).

At this point, the algorithm logic will invoke the "Perform Action on Segment" routine, locate the next segment in the segment list, and return control to the above check for End-of-List pointer.

Note that the algorithm for the PACMS routine continues locating segments in the Segment List until an End-of-List segment pointer is found. If the segment list is empty, such a pointer is found in the Segment List Head pointer immediately upon entry to the routine. If the segment list is not empty, such a pointer is found in the Link to Next Segment field in the segment header of the last segment in the list.

When the End-of-List pointer is found, the segment operation determined by the "Perform Action on Segment" routine has been performed upon all the required segments, specified either as <all segments matching the matching class> or as <all segments>, and the PACMS routine exits, returning control to the Segment Operation Routine which invoked it.

Figure 5C:
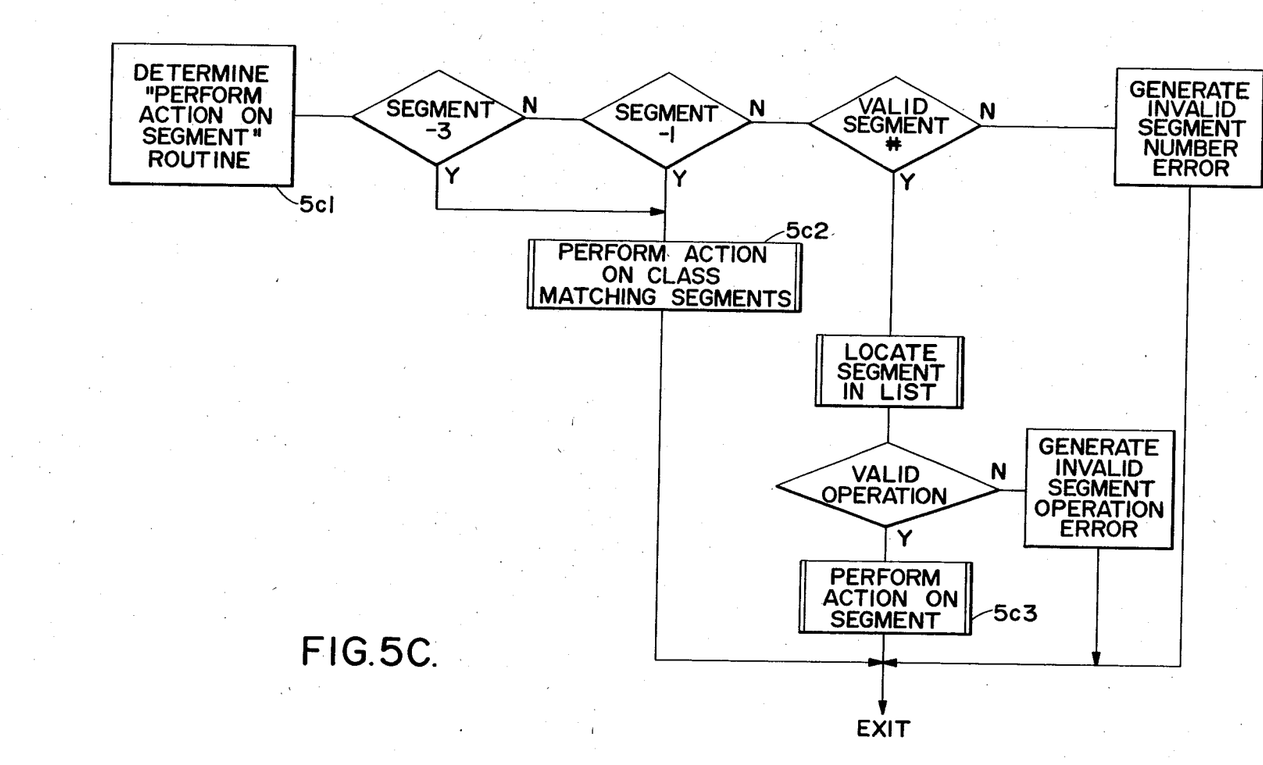

Next, consider the case where the search is performed by the microprocessor 12 and the GPPP 38. When microprocessor 12 receives a segment opertion command, control is passed to a Segment Operation Routine, contained in program memories 16 or 18, for that command. FIG. 5c is a flowchart showing the logic of such a routine. There may be one of these routines for each segment operation for which <all segments matching the matching class> or <all segments> are valid segment specifiers AND for which program memory 24 (FIG. 2d) contains a "Perform Action on Segment" routine.

The algorithms and logic for a Segment Operation Routine 5c are identical to those of a Segment Operation Routine 5a with two exceptions. The first exception is that the Determine "Perform Action on Segment" Routine 5c1 identifies a "Perform Action on Segment" routine in GPPP program memory 24. Typically, this will be done with a code number rather than with a program address. The second exception is that the two subroutines Perform Action on Class Matching Segments (PACMS) 5c2 and "Perform Action on Segment" 5c3 reside in program memory 24 and execute under control of sequencer 23 rather than microprocessor 12. Microprocessor 12 invokes these subroutines by commands to the Display Controller Picture Processor 40 (FIG. 2b).

The function and algorithmic description of the Perform Action on Class Matching Segments (PACMS) routine residing in GPPP program memory 24 is the same as that given above for the corresponding routine residing in program memories 16 or 18 except that exit to the invoking routine in program memories 16 or 18 is done with an interrupt or semaphore from picture processor 40 to microprocessor 12 via the system bus. FIG. 5b is a flowchart for the PACMS routine.

The functions of the "Perform Action on Segment" routines residing in GPPP program memory 24 are identical to the functions of the corresponding routines residing in the program memory 20 in the case where microprocessor 12 performs all segment list search and class matching logic (FIG. 5a, 5b).

As mentioned above, the search for segments which match the current matching class "inclusion array" and "exclusion array" may be performed by the combined action of microprocessor 12 (FIG. 2a), general purpose picture processor 38 (FIG. 2d), and the special purpose picture processor 39 class matching logic 36 (FIG. 2c).

When microprocessor 12 receives a segment operation command, control is passed to a Segment Operation Routine, contained in program memories 16 or 18, for that command. This Segment Operation Routine is both functionally and algorithmically identical to the Segment Operation Routine used when only microprocessor 12 and GPPP 38 perform the segment search (FIG. 5c). In addition, the "Perform Action on Segment" routines invoked at 5c1 (FIG. 5c) are identical to those used when only microprocessor 12 and GPPP 38 perform the segment search.

Figure 5D:
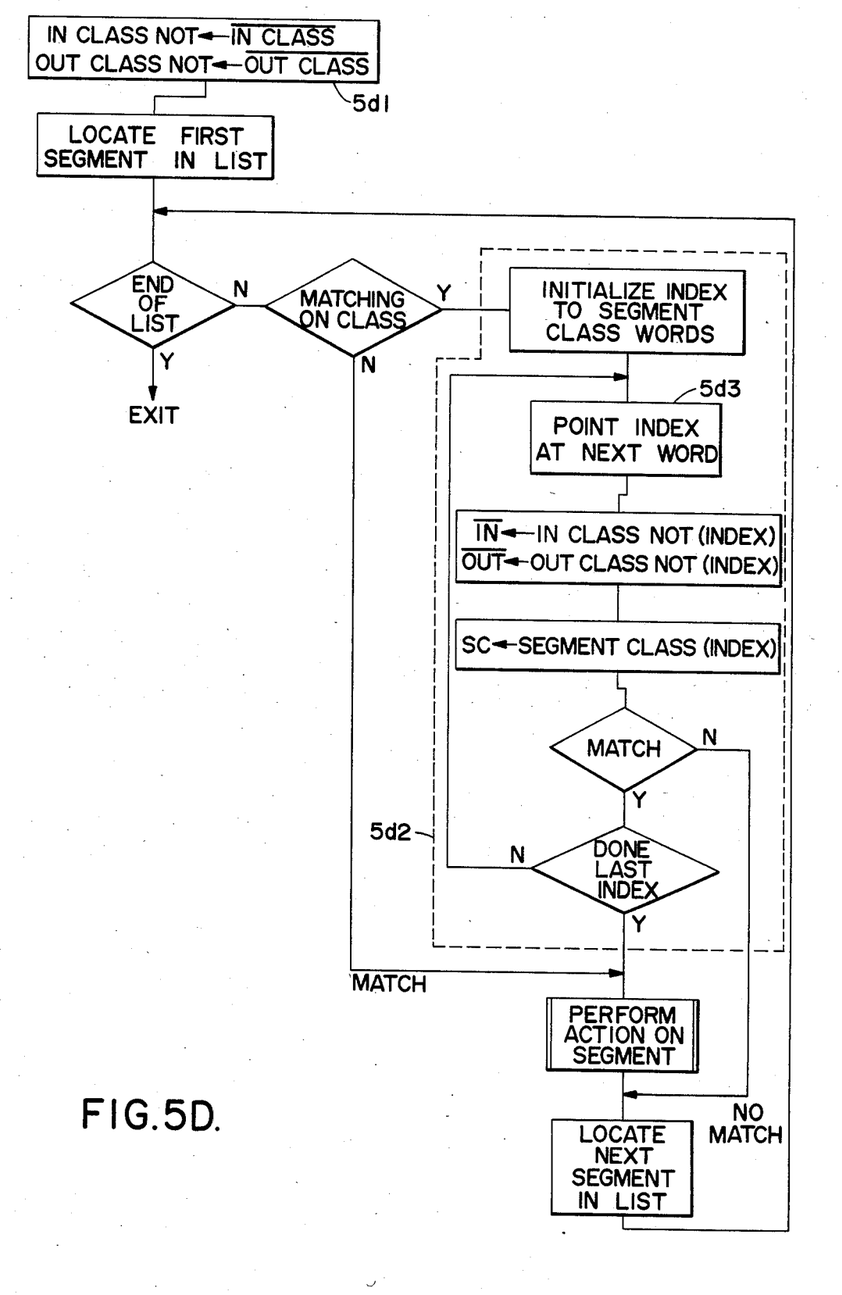

The Perform Action on Class Matching Segments (PACMS) routine invoked at 5c2 (FIG. 5c) differs in its class matching logic from the PACMS in FIG. 5b. FIG. 5d is a flowchart for this routine, which resides in program memory 24 and which uses the SPPP 39 to perform its class matching logic. Since the routine differs from the one in FIG. 5b, which has been previously described, only in an additional initialization block 5d1 and in the segment class matching logic 5d2, only these changes will be detailed.

When the routine is entered, the entire InClass and OutClass arrays in segment data memory 20 are copied into scratch RAM data memory 25 in the GPPP (FIG. 2d) and are stored there in ones-complement form as the arrays "InClassNot" and "OutClassNot". In other words, each bit of the "InClassNot" array has the opposite value (0 or 1) from its corresponding bit in the InClass array, and the same is true of "OutClassNot" and OutClass. This is represented in block 5d1.

When matching logic 5d2 is entered, the temporary variable INDEX is initialized and then adjusted at 5d3 so that it will locate the next array word positions to test (the INDEX initialization value must be chosen so that after the first adjustment upon entry, INDEX locates the first word to be tested.

Next, InClassNot (INDEX) is loaded from scratch data memory 25 into SPPP register $\overline{\text{IN}}$ 29 (FIG. 2c), and OutClassNot (INDEX) is loaded from scratch data memory 25 into SPPP register $\overline{\text{OUT}}$ 28. (The data path between the GPPP 38 and the SPPP 39 is the PBUS, and when GPPP 38 puts the appropriate data on the PBUS it is latched into the appropriate register ($\overline{\text{OUT}}$, $\overline{\text{IN}}$, SC) by microcode decoder 34 which interprets the microcode control bits 41 from the GPPP.

The SegClass (INDEX) word is now loaded from segment data memory 20 into register SC 30, via the System Bus Interface 35 and the PBUS. This is synchronized with the memory fetch cycle on the System Bus by the GPPP testing the System Bus I/F 35's status line through flag mux 33.

At this point the $\overline{\text{OUT}}$, $\overline{\text{IN}}$, and SC registers contain the appropriate data so that the true/false match of SegClass (INDEX) against InClass (INDEX) and OutClass (INDEX) is represented by a (1/0) value on the MATCH signal from AND logic 32. The n 1-bit multiplexers 31 are controlled by the select lines from SC. (Note that SPPP class matching logic is n bits wide where n is the appropriate word size). If a bit in SC has the value 1, the corresonding bit in $\overline{\text{OUT}}$ is passed through to the AND logic 32. If a bit in SC has the value 0, the corresponding bit in $\overline{\text{IN}}$ is passed through to the AND logic 32.

Next, the GPPP sets flag mux 33 to select the MATCH line and does a conditional branch based on the MATCH line status. If the MATCH is false (0), the NOMATCH branch from the segment class matching logic 5d2 is taken. If the MATH is true (1), INDEX is checked to determine whether it is the last INDEX to be processed for the class arrays. If it is not the last value, control returns to block 5d3, where INDEX will be adjusted to locate the next array word positions to test.

This completes the description of the segment class matching logic 5d2, and thus of the Perform Action on Class Matching Segments routine in the case where both GPPP 38 and SPPP 39 are used to perform the segment class matching required by a Segment Operation Routine (FIG. 5c).

Figure 5E:
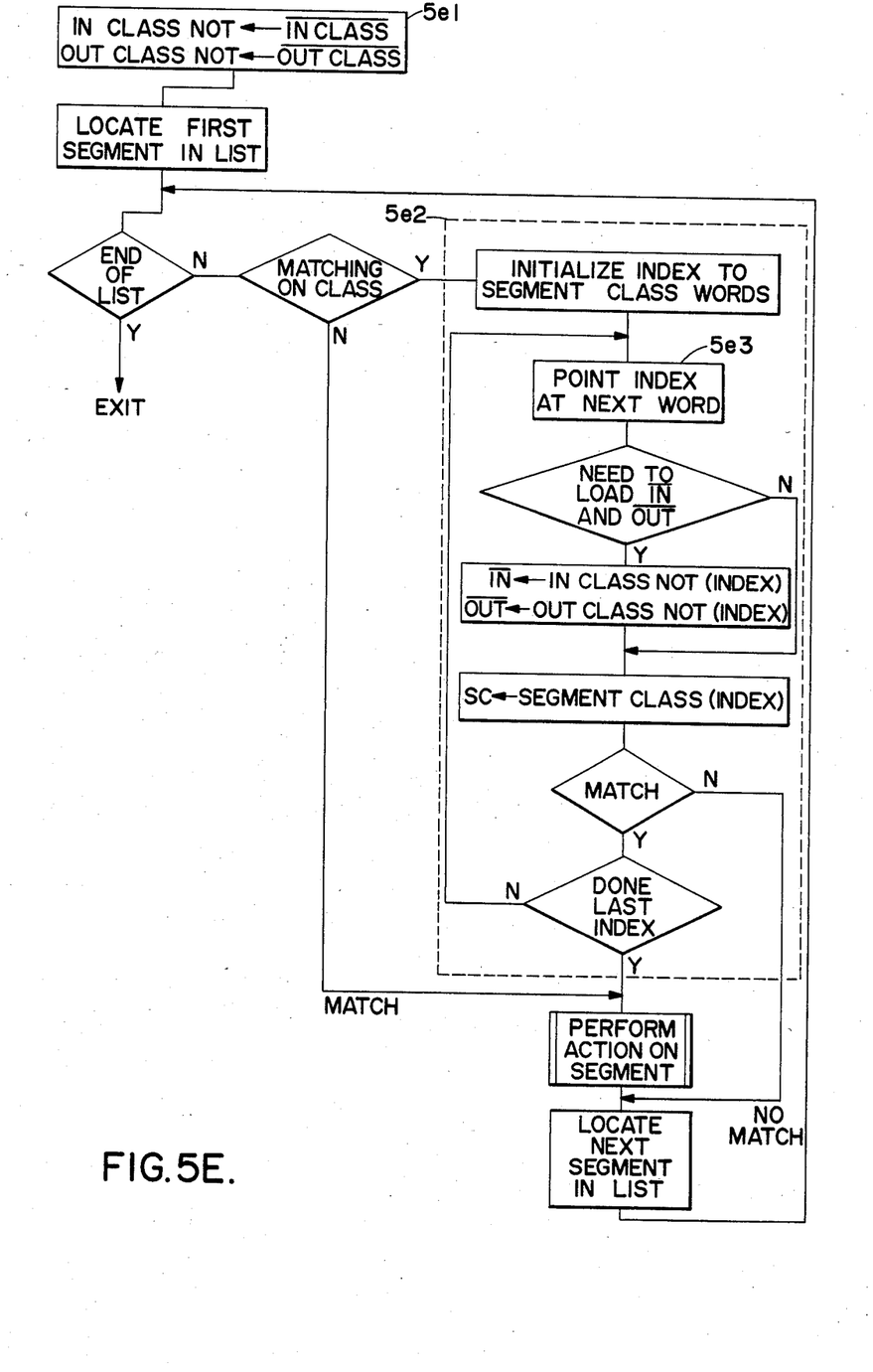

FIG. 5e is a flowchart for an alternative PACMS routine which removes the necessity for reloading registers $\overline{\text{OUT}}$ 28 and $\overline{\text{IN}}$ 29 on *each* class word matching handshake cycle between the GPPP 38 and the SPPP 39. The test at 5e1 determines whether the registers $\overline{\text{OUT}}$ and $\overline{\text{IN}}$ *already contain* the proper complemented word values from OutClass (INDEX) and InClass (INDEX). If the $\overline{\text{OUT}}$ and $\overline{\text{IN}}$ registers already contain the proper values, the loading of the values from the data memory 25 OutClassNot (INDEX) and InClassNot (INDEX) words is bypassed.

Figure 5F:
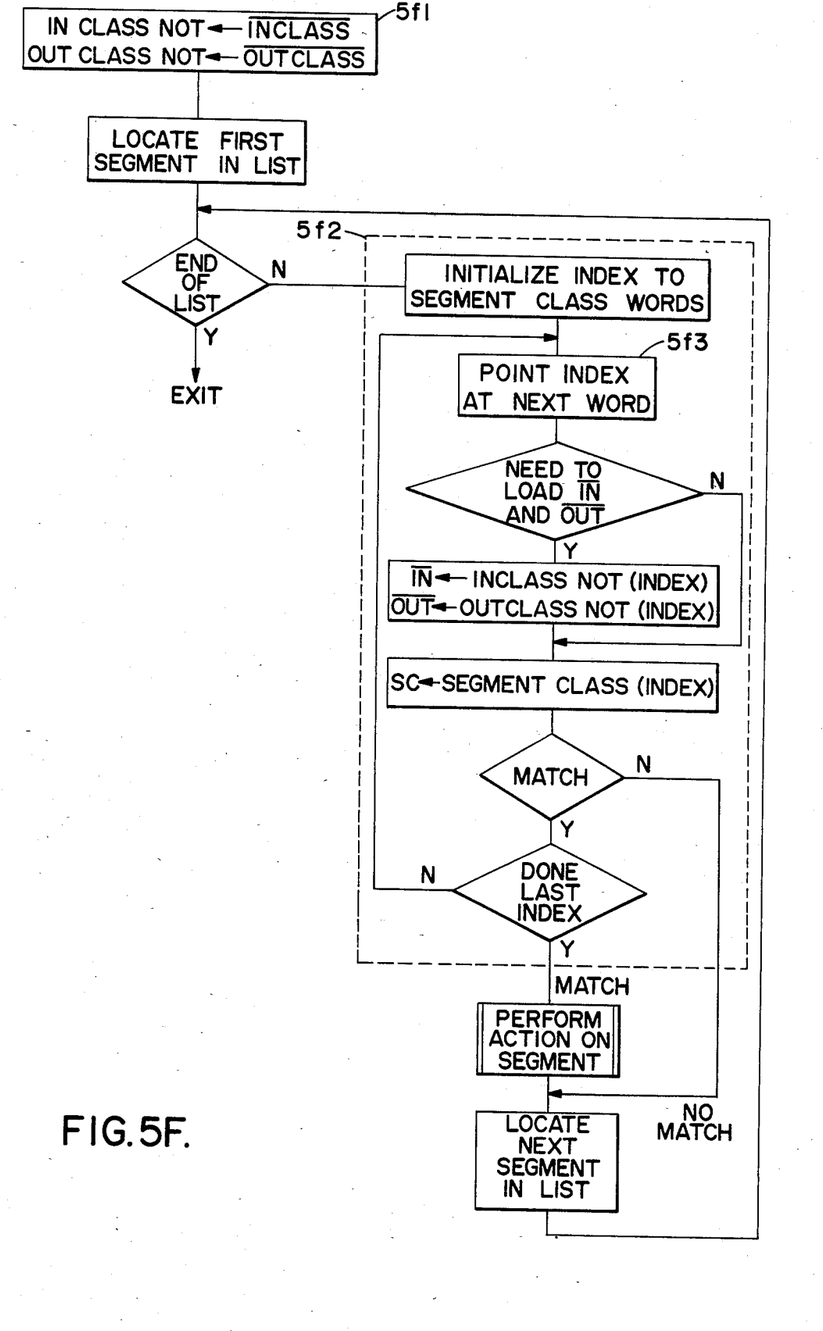

FIG. 5f is a flowchart for another alternative PACMS routine which removes the necessity for checking to see whether the "Matching on Class" is in effect. To use this subroutine to select <all segments>, the invoking Segment Operation Routine in program memories 16 and 18 first saves the contents of the InClass and OutClass arrays in a save area in segment data memory 20 and then zeros all words in the InClass and OutClass arrays. The zero value for all bits in the arrays will cause all segments to be selected when the PACMS is invoked, and the InClass and OutClass array values are restored after the return to the Segment Operation Routine in program data memories 16 or 18.

Note that, in all the above descriptions, the Segment Operation Routines need not be limited to those operations which perform an *immediate* action on visible segments on the CRT or other display surface. For example, the terminal command <set-segment-class> may be used with the reserved segment number representing <all segments matching the matching class> to set or reset any combination of bits in the segment class fields of the segments which have been selected.

Also note that there is no inherent distinction between the Segment Class words in segment headers in segment data memory 20 and other data or attribute words in these headers. Thus any combination of bit values in any words in the segment headers may be used to select segments if the allowable range of the INDEX value is extended to include all words in the segment header. Clearly, an *exact* match of a segment class word or subfield with a value W may be obtained by setting the corresponding words or subfields in the InClass and OutClass arrays to be W and $\overline{W}$ (the ones-complement) respectively.

The invention being thus described, it will be obvious that the same may be varied in many ways. Such variations are not to be regarded as a departure from the spirit and scope of the invention and all such modifications as would be obvious to one skilled in the art are intended to be included within the scope of the following claims.

What I claim as my invention is:

1. An apparatus for classifying display segments on a Graphics Display Terminal, comprising:

introducing means for introducing a new segment number and new classification information associated with the new segment into said graphics display terminal;

storing means for storing a plurality of segment words therein, each of said segment words including a segment number and current classification information associated with the segment; and processing means responsive to the new classification information introduced via said introducing means for locating a segment word in the storing means having a segment number corresponding to said new segment number and for comparing the current classification information of the located segment word with the new classification information introduced via said introducing means, said processing means changing the current classification information of the located segment word to correspond to the new classification information, said processing means storing the located segment word having the changed classification information in said storing means in response thereto.

2. An apparatus for highlighting one or more segments on a display of a graphics display terminal, comprising:

introducing means for introducing a matching condition and a highlighting command into said graphics display terminal, said matching condition including a set of classification conditions;

storing means for storing a plurality of segment words therein, each of said segment words including a segment number and current classification information associocated with the segment; and processing means responsive to the matching condition introduced via said introducing means for comparing the current classification information of the segment words stored in said storing means with said set of classification conditions and determining the set of all segment words satisfying said set of classification conditions, said processing means developing a highlighting signal in response to said highlighting command; and display control means connected to said processing means for controlling the display on a display means of said graphics display terminal, said display control means highlighting the segments on said display means which fall within the determined set of all segment words satisfying said set of classification conditions in response to said highlighting signal.

3. An apparatus for performing operations on segments of a graphics display comprising:

means for processing segment classification information;

means for storing individual segments in a plurality of classes specified by said segment classification information;

means for generating a segment operation command;

means for identifying a valid segment operation command; and means for executing said valid segment operation command on a set of segments specified by said valid segment operation command.

4. An apparatus as recited in claim 3 wherein said means for storing individual segments comprises a segment memory having a plurality of segment words, one for each of said segments, each of said segment words including an attributes section and a class information section, said class information section having a plurality of bits associated with a plurality of classes, said bits identifying the ones of said classes of which said segment is a member.

5. An apparatus for performing operations on segments of a graphics display comprising:

means for processing segment classification information;

means for storing individual segments in a plurality of classes specified by said segment classification information;

means for generating a segment operation command;

means for assigning and for removing a segment to and from a group of said classes, respectively; and means for determining a Boolean class-matching condition to specify a set of said segments by their class membership so that a specified segment operation is performed on said set by a single command.

6. A method for performing operations on a segment of a graphics display comprising the steps of:

generating a segment operation command;

determining an operation to be performed on a segment, said operation being based upon said segment operation command;

generating segment number identifiers;

checking a segment number identifier to assure a valid segment number;

storing a list of segments;

locating a segment in said list of segments, said segment corresponding to said valid segment number;

performing an operation on said segment, said operation being specified by said received segment operation command; and repeating said locating and performing steps for all segments within a set specified by received segment operation command.

* * * * *